Patented Apr. 1, 1941

2,236,825

UNITED STATES PATENT OFFICE 2,236,825

PRODUCTION OF AROMATIC SULPHON-
AMIDES

Joseph R. Mares, Webster Groves, Mo., assignor to
Monsanto Chemical Company, St. Louis, Mo., a
corporation of Delaware No Drawing. Application August 8, 1938,
Serial No. 223,723

7 Claims. (Cl. 260—556)

The present invention contemplates the manufacture of aromatic sulphonamides and it deals particularly with sulphonamides which can be volatilized.

Heretofore, aromatic sulphonamides have been made by reacting ammonia or ammonia compounds with the corresponding sulphone chloride. This procedure affords good yields. However, it necessitates the manufacture of the sulphonic acid chloride and, in consequence thereof, increases the cost of the product very materially over what might otherwise be the cost if the sulphonic acid could be used, a fact which can be appreciated better by realizing that the sulphonic acid is, in most cases, made conveniently by reacting the aromatic compound with sulphuric acid whereas the acid chloride can be made from the acid only by the use of a large excess of chlorosulphonic acid or some other extremely active agent such as thionyl chloride, phosphorous trichloride or pentachloride.

It is known that when one heats ammonium salts of aromatic carboxylic acids the corresponding amides are formed. Stenhouse, "Annalen," volume 140, page 294, reports that by heating the ammonium salt by benzene sulphonic acid he obtained approximately 1% of the sulphonamides. Yields of this order obviously have no commercial interest. I have now found it possible to produce in good yields the aromatic sulphonamides generally, and especially, those which are volatilizable, by subjecting the corresponding ammonium sulphonate to reaction temperature under conditions which enable one to withdraw the product immediately as formed from the zone of reaction whereby further pyrolysis is avoided.

The invention may be performed in various ways; for example: the ammonium salt may be heated, while suspended in a non-reactive gaseous medium, to reaction temperature and subsequently be withdrawn from the reaction temperature zone. To this end I suspend the ammonium salt as a dust in air (or preferably combusted air which is lean in oxygen), nitrogen, ammonia, steam, carbon dioxide, or flue gas, and pass the dust suspension through a heated tube whereby a temperature of 225–400° C. is attained. The exhaust gas from an internal combustion engine is useful for my purpose since it provides the required heat and inertness. Some decomposition takes place especially in the higher temperature ranges which, however, can be minimized by maintaining a turbulent flow through the tube and reducing the time of contact. If desired, the salt may be suspended in the gaseous medium after the latter has been suitably preheated to the reaction temperature. After the pyrolysis has proceeded to the desired extent the suspension containing volatilized amide is chilled as by a direct water spray.

One convenient procedure in which an internal combustion engine exhaust is used consists in operating only the four cylinders of one side of a V-8 engine in the usual manner and feeding finely ground ammonium salt, along with air or exhaust gas, into the manifold normally supplying fuel to the other set of four cylinders. The exhaust gases of both sides of the engine are mixed whereby the desired pyrolysis occurs, after which the reaction is interrupted and the product is recovered in a water spray.

An alternative procedure which I have found effective is to heat the ammonium salt of the sulphonic acid under reduced pressure and at sufficiently elevated temperatures to induce thermal decomposition. For this purpose a temperature of 275–375° C. at pressures of 40 mm. or less, gives good results. The product is volatilized as formed under these conditions, and immediately cooled or condensed. The reaction vessel is equipped with a condenser which should be suitably connected by insulated lines to the still to avoid condensation and clogging of the lines by the amide product.

A further alternative procedure consists in heating solid ammonium benzene sulphonate in a reaction vessel containing a small amount of mercury or other heat transmitting agent which acts as a heat transfer medium and which causes the ammonium salt to liberate water, forming the amide. The resulting vapors leaving the reaction vessel are cooled whereby the amide may be recovered as above.

In each of the above procedures the amide is recovered conveniently in pure form by recrystallizing the product from hot water.

The present invention is particularly applicable to the manufacture of sulphonamides of the benzene series such as benzene sulphonamide, ortho-toluene sulphonamide, para-toluene sulphonamide, xylene sulphonamide, etc.; however, it is not so limited. It includes the derivatives such as the chlorobenzene sulphonamide, polynuclear aromatic sulphonamides, such as naphthalene sulphonamide, etc. The ammonium salt which I use as a raw material may be made by any of the well known methods. Generally, I prefer to have material which is as free of impurities as reasonably possible.

My invention is not limited to any particular apparatus or to any specific temperature condition. I prefer to avoid such high temperatures as induce excessive decomposition of amides formed, even though this entails recovery of the unreacted ammonium salt. Drastic temperature conditions result in the formation of sulphur dioxide and aromatic hydrocarbon, for example, benzene. The actual temperature used is dependent to a very large extent upon the time of exposure and accordingly, considerable latitude with respect to time and temperature is permitted.

What I claim is:

1. In the manufacture of aromatic sulphonamides of the group consisting of aryl and halogenated aryl sulphonamides by the pyrolysis of the corresponding aromatic ammonium sulphonate, the improvement which comprises heating the aromatic sulphonate in a reaction zone to a temperature above 225° C. and below a temperature at which the reaction product undergoes substantial decomposition, positively withdrawing the products of the reaction from the reaction zone and maintaining the temperature of the withdrawn reaction products below the decomposition temperature of the sulphonamide.

2. In the manufacture of aromatic sulphonamides of the group consisting of aryl and halogenated aryl sulphonamides by the pyrolysis of the corresponding aromatic ammonium sulphonate, the improvement which comprises heating the aromatic sulphonate in a reaction zone to a temperature above 225° C. and below a temperature at which the reaction product undergoes substantial decomposition, and positively withdrawing the product of the reaction from the reaction zone.

3. In the manufacture of aryl sulphonamides by the pyrolysis of the corresponding aryl ammonium sulphonate, the improvement which comprises heating the aryl sulphonamide in a reaction zone to a temperature above 225° C. and below a temperature at which the reaction product undergoes substantial decomposition, and positively withdrawing the products of the reaction as they are formed from the reaction zone by maintaining subatmospheric pressure conditions within the reaction zone.

4. In the manufacture of benzene sulphonamides by the pyrolysis of the ammonium salt of benzene sulphonate, the improvement which comprises effecting the pyrolysis in a reaction zone at a temperature above 225° C. and below a temperature at which the reaction product undergoes substantial decomposition, and positively removing the products of the reaction from the reaction zone by effecting the reaction under subatmospheric pressure and cooling the withdrawn reaction products below the decomposition temperature of the benezene sulfonamide.

5. In the manufacture of aryl sulphonamides by the pyrolysis of the corresponding aryl ammonium sulphonate, the improvement which comprises heating in a reaction zone the aryl ammonium sulphonate to a temperature within the range of 225° to 400° C., and positively withdrawing the reaction products from the reaction zone as they are formed and reducing the temperature thereof below the decomposition temperature of the amide product.

6. In the manufacture of aryl sulphonamides by the pyrolysis of the corresponding ammonium salt of the aryl sulphonic acid, the improvement which comprises introducing the salt into a reaction zone heated to a temperature above 225° C. and below a temperature at which the reaction product undergoes substantial decomposition while positively removing the vapors formed from the reaction zone by maintaining subatmospheric pressure conditions therein and cooling the vapors so withdrawn below the decomposition temperature of the amide.

7. In the manufacture of aryl sulphonamides by the pyrolysis of the corresponding aryl ammonium sulphonate, the improvement which comprises passing a suspension of the aryl ammonium salt in a non-reacting gaseous medium through a heating zone and heating the product in the heating zone at a temperature above 225° C. and below a temperature at which the reaction product undergoes substantial decomposition, immediately withdrawing the reaction products from the reaction zone and recovering therefrom the aryl sulphonamide.

JOSEPH R. MARES.